(12) United States Patent
Drespling et al.

(10) Patent No.: US 9,057,628 B2
(45) Date of Patent: Jun. 16, 2015

(54) POSITION SENSOR AND LINEAR ACTUATOR

(75) Inventors: Hans-Peter Drespling, Heidenheim (DE); Marc Niebel, Berglen (DE); Jochen Waidelich, Löchgau (DE)

(73) Assignee: Mahle International GmbH (DE)

( * ) Notice: Subject to any disclaimer, the term of this patent is extended or adjusted under 35 U.S.C. 154(b) by 488 days.

(21) Appl. No.: 13/387,656

(22) PCT Filed: Jul. 21, 2010

(86) PCT No.: PCT/EP2010/060543
§ 371 (c)(1),
(2), (4) Date: Jan. 27, 2012

(87) PCT Pub. No.: WO2011/012511
PCT Pub. Date: Feb. 3, 2011

(65) Prior Publication Data
US 2012/0126796 A1 May 24, 2012

(30) Foreign Application Priority Data
Jul. 28, 2009 (DE) .......................... 10 2009 035 091

(51) Int. Cl.
G01R 33/07 (2006.01)
G01B 7/14 (2006.01)
G01D 5/14 (2006.01)
G01B 7/30 (2006.01)

(52) U.S. Cl.
CPC ...................................... *G01D 5/145* (2013.01)

(58) Field of Classification Search
CPC ........................................................ G01R 33/07
USPC ............... 324/207.2, 207.24, 207.25
See application file for complete search history.

(56) References Cited

U.S. PATENT DOCUMENTS 6,731,109 B2  5/2004 Johnson et al.
7,088,095 B1  8/2006 Busch
(Continued)

FOREIGN PATENT DOCUMENTS

CN  1961199 A  5/2007
DE  3123572 A1  12/1982
(Continued)

OTHER PUBLICATIONS

Translation for JP2008185587, Aug. 2008.
(Continued)

*Primary Examiner* — Bot Ledynh
(74) *Attorney, Agent, or Firm* — Fishman Stewart Yamaguchi PLLC

(57) ABSTRACT

A linear magnetic position sensor may include a magnetic field generating unit having two permanent magnets for generating a magnetic field. A Hall sensor may be disposed in a region of the magnetic field forming a linear measuring section, wherein the Hall sensor and the magnetic field generating unit are linearly displaceable relative to one another along a longitudinal direction in order to position the Hall sensor within the measuring section. The permanent magnets may be polarized in a transverse direction running perpendicular to the longitudinal direction. The permanent magnets may be spaced apart from one another in the longitudinal direction. Each pole of one of the permanent magnets may be connected to a pole of the other permanent magnet via a magnetic conductor element.

19 Claims, 6 Drawing Sheets

(56) References Cited

U.S. PATENT DOCUMENTS

| | | |
|---|---|---|
| 8,143,883 B2 | 3/2012 | Maerky et al. |
| 2002/0118011 A1* | 8/2002 | Wolf .......................... 324/207.2 |
| 2002/0190703 A1* | 12/2002 | Goto et al. ................ 324/117 H |
| 2005/0134257 A1 | 6/2005 | Etherington et al. |
| 2007/0216402 A1 | 9/2007 | Blessing et al. |
| 2008/0099967 A1* | 5/2008 | Spratte et al. ............ 267/140.14 |
| 2008/0272768 A1 | 11/2008 | Maerky et al. |

FOREIGN PATENT DOCUMENTS

| | | |
|---|---|---|
| DE | 20218754 U1 | 2/2003 |
| DE | 102006048084 A1 | 4/2008 |
| JP | S62-63811 | 3/1987 |
| JP | 62-168001 | 7/1987 |
| JP | 63-0231201 | 9/1988 |
| JP | 3-269318 | 11/1991 |
| JP | H08-297004 A | 11/1996 |
| JP | 9-264703 | 10/1997 |
| JP | 2003-527670 A | 9/2003 |
| JP | 2004-184364 A | 7/2004 |
| JP | 2007-298364 A | 11/2007 |
| JP | 2008185587 A | 8/2008 |
| WO | WO-2004074853 A2 | 9/2004 |

OTHER PUBLICATIONS

English Abstract for DE3123572A1, Dec. 1982.
Japanese Office Action for 2012-522107 with English translation of the Notice of Reasons for Rejections (from parallel JP patent application), Jul. 2014.
English abstract for JP-6-264703, Oct. 1997.
English abstract for JP62-168001, Jul. 1987.
English translation of JPOA for JP-2012-522107, dated Oct. 1, 2013.
English abstract for DE-102006048084, Apr. 2008.
English abstract for DE-20218754, Feb. 2003.
English abstract for JP3-2693181, Nov. 1991.
English abstract for JP63-231201, Sep. 1988.
English abstract for JP2007-298364, Nov. 2007.
English abstract for JP 2004-184364, Jul. 2004.
English translation for decision of dismissal of amendment dated Oct. 21, 2014 for JP2012-522107.
Translated JP Office Action for JP2012-522107, dated Feb. 25, 2015.
English abstract for JPS62-63811.
English abstract for JPH08-297004.

* cited by examiner

POSITION SENSOR AND LINEAR ACTUATOR

CROSS-REFERENCE TO RELATED APPLICATIONS

This application claims priority to German Patent Applications 10 2009 035 091.8 filed on Jul. 28, 2009 and PCT/EP2010/060543 filed on Jul. 21, 2010, which are hereby incorporated by reference in their entireties.

BACKGROUND

The present invention relates to a linear magnetic position sensor with the features of the preamble of the claim 1. The present invention further relates to a linear actuator equipped with such a position sensor.

TECHNICAL FIELD

Linear magnetic position sensors work with a Hall sensor which, in a linear measuring section, can be displaced relative to a magnetic field which is generated by means of a permanent magnet. Along the measuring section, the magnetic field changes which is detected by the Hall sensor and can be converted by means of a suitable evaluation circuit into a relative position between the Hall sensor and the magnetic field or measuring section, respectively. In order to be able to carry out a position measurement as exact as possible, a magnetic field as linear as possible within the measuring section is of advantage. In the case of a linear magnetic field, the magnetic field strength changes linearly, thus with a constant gradient. Since magnetic flux lines spread out spatially from a permanent magnet, such a linear magnetic field cannot be implemented within a measuring section without difficulties.

From U.S. Pat. No. 7,088,095 B1, a linear magnetic position sensor is known which has a magnetic field generating unit having two permanent magnets for generating a magnetic field. Said known position sensor further comprises a Hall sensor which is disposed in a region of the magnetic field forming a linear measuring section. The Hall sensor and the magnetic field generating unit can be linearly displaced relative to one another along a longitudinal direction in order to position the Hall sensor within the measuring section. Furthermore, the permanent magnets are polarized in a transverse direction running perpendicular to the longitudinal direction. This means that north pole and south pole on the respective permanent magnet are located at opposite ends with respect to the transverse direction.

In order to generate a linear magnetic field within the measuring section, the two permanent magnets of the known position sensor are configured in such a manner that they extend in the longitudinal direction laterally along the entire measuring section and beyond both ends of said measuring section. Furthermore, they are oppositely polarized so that, e.g., the two south poles face each other. Moreover, on their inner sides facing each other and the measuring section, both permanent magnets are in each case convexly curved. The curvatures are configured such that the desired linear magnetic field within the measuring section is obtained.

This approach is comparatively complicated. For example, tolerances during the manufacture of the curved inner sides can result in significant deviations in terms of the linearity of the desired magnetic field. Also, the Hall sensor has to be positioned and displaced very accurately relative to the permanent magnets in order to remain within the linear region of the magnetic field.

From US 2005/0134257 A1, another position sensor is known which works with four individual permanent magnets which have tapered profiles thereby generating a rhombic measuring section. The permanent magnets which extend toward each other in the longitudinal direction and thereby become tapered are spaced apart from each other in the center of the measuring section. In the case of the known position sensor, an open magnetic circuit is generated by means of the permanent magnets. Here, the tapered permanent magnets extend laterally along a substantial portion of the measuring section. Such an open magnetic circuit is in particular susceptible to faults due to thermal influences.

SUMMARY

The present invention is concerned with the problem of providing an improved embodiment for a position sensor of the aforementioned type and/or for a linear actuator equipped therewith which is in particular characterized by a comparatively inexpensive producibility.

This problem is solved according to the invention by the subject matters of the independent claims. Advantageous embodiments are subject matter of the dependent claims.

The invention is based on the general idea to space the permanent magnets apart from each other in the longitudinal direction and to connect them at their poles by means of magnetic conductor elements. Via the two magnetic conductor elements, the two permanent magnets are connected to each other so as to form a closed magnetic circuit. The magnetic field generated by means of the magnetic field generating unit is thus located in the longitudinal direction between the permanent magnets and in the transverse direction between the magnetic conductor elements. Here, at least in the region of the measuring section, the magnetic field is not formed directly by the magnetic field of the permanent magnets, but only indirectly, namely by the magnetic flux in the magnetic conductor elements. The invention utilizes the knowledge here that within the magnetic conductor elements, a comparatively homogenous magnetic field exists, whereby a largely linear magnetic field prevails also between the magnetic conductor elements in the region of the measuring section. At the same time, the proposed magnetic field generating unit requires only extremely simple geometries for the permanent magnets and the magnetic conductor elements, which simplifies the production. In addition, the susceptibility to manufacturing tolerances is significantly reduced. With the closed magnetic circuit, thermal influences can be reduced.

For example, at inner sides facing each other and facing the measuring section, the magnetic conductor elements can be disposed equidistantly in the longitudinal direction and/or can have a flat shape, which simplifies the production of the same. Additionally or alternatively, the magnetic conductor elements can extend in the longitudinal direction and/or extend parallel to each another. Furthermore, the magnetic conductor elements can extend linearly and/or can have in each case a constant cross-sectional profile in the longitudinal direction. Alternatively, for further selectively influencing the magnetic field within and/or outside of the measuring section, it is also possible to shape the magnetic conductor elements in a trapezoidal, bent, curved, or in another suitable manner. In particular along the longitudinal direction, the magnetic conductor elements can have a varying width and/or a varying thickness, wherein it is advantageous if they have a mirror-symmetrical structure. In general, the magnetic conductor elements can be geometrically configured according to a preferred embodiment in such a manner that a substantially linear magnetic field is present in the measuring section.

The magnetic conductor elements preferably consist of a magnetically soft material, in particular of a ferromagnetic material and preferably of an iron sheet.

Particularly advantageous is a construction in which each magnetic conductor element connects the south pole of the one permanent magnet to the north pole of the other permanent magnet. This results in a self-contained closed magnetic field path.

It was found that it is of advantage to configure the measuring section, within which the Hall sensor can be linearly positioned, in the longitudinal direction in such a manner that it is shorter than a magnet distance between the permanent magnets. It can be advantageous here to dispose the measuring section centered between the permanent magnets. This configuration is based on the knowledge that the magnetic field directly generated by the permanent magnets has an influence on the magnetic field measurement of the Hall sensor, which influence increases with decreasing distance. By shortening the measuring section with respect to the magnet distance, the Hall sensor is spaced apart from the permanent magnets also at the longitudinal ends of the measuring section, which improves the accuracy of the position measurement.

It was also found that it is advantageous for implementing a magnetic field as linear as possible within the measuring section if the inner permanent magnet ends facing toward the measuring section have a magnet distance from each other in the longitudinal direction which is at least as large as or larger than the measuring section. Thereby, it is in particular possible to produce the permanent magnets with a particularly simple geometry, e.g., as a cuboid with rectangular surfaces, which can be implemented in a comparatively inexpensive manner. Additionally or alternatively, the permanent magnets can be disposed in the longitudinal direction completely outside of the measuring section, whereby their influence on the magnetic field within the measuring section is considerably reduced so that said magnetic field is largely and preferably exclusively determined by the magnetic flux within the magnetic conductor elements.

Particularly advantageous in this connection is a refinement in which the measuring section is spaced apart at its longitudinal ends from the permanent magnets in such a manner that at the longitudinal ends of the measuring section, the influence of the magnetic field of the adjacent permanent magnet on the prevailing magnet field between the magnetic conductor elements in the measuring section can be disregarded for the magnetic field measurement of the Hall sensor. This construction ensures that measurements are performed exclusively in the linear region of the magnetic field.

Likewise, it is of advantage to provide the magnetic conductor elements in the transverse direction with such a thickness that substantially no magnetic saturation occurs in the magnetic conductor elements. With this construction, a high homogeneity of magnetic flux lines can be achieved within the magnetic conductor elements, which improves the linearity of the magnetic field between the magnetic conductor elements. As soon as the magnetic saturation occurs within the magnetic conductor elements, there is the risk that the magnetic flux lines spread also outside of the magnetic conductor elements resulting in a stray magnetic field which affects the linearity of the magnetic field within the measuring section.

The position sensor introduced here can particularly advantageously be used in a linear actuator which comprises a coupling rod and an actuator unit. The coupling rod can be coupled to a component that is to be displaced linearly, and is linearly displaceable relative to an actuator housing. The actuator unit serves for linearly displacing the coupling rod. The position sensor is provided for detecting the relative position between coupling rod and actuator housing. For this, according to an advantageous embodiment, the coupling rod can be drivingly connected to the magnetic field generating unit, whereas the Hall sensor is rigidly connected to the actuator housing.

According to a preferred design, a Hall sensor unit can be provided which includes the Hall sensor and also electrical connections of the position sensor and which is mounted on the actuator housing. The position sensor and the linear actuator are adapted to each other with respect to their components in such a manner that, on the one hand, a separate production is possible and, on the other, a simplified assembly can be implemented.

According to another refinement, a magnet unit can be provided which includes the magnetic field generating unit and which is disposed in a linear guide formed on the actuator housing so as to be displaceable in a linearly guided manner. In this manner, all essential components of the position sensor, namely the linear guide of the magnet unit, are provided in one component of the linear actuator, namely in the actuator housing, which increases the mutual structural integration of linear actuator and position sensor and thus simplifies the production and the assembly.

The actuator is configured in such a manner that it can be used for controlling a fluid flow, in particular of gases such as, e.g., fresh air fed to an internal combustion engine but also exhaust gases of an internal combustion engine. Here, the actuator can be connected to a throttle unit which is in particular configured as a butterfly valve. With the position sensor, the position of the throttle unit and thus the flow rate of the fluid can be controlled. The actuator can be configured, for example, as a vacuum cell or as an electrically driven/actuated control element.

Further important features and advantages of the invention arise from the sub-claims, from the drawings, and from the associated description of the figures based on the drawings.

It is to be understood that the above mentioned features and the features still to be explained hereinafter are not only usable in the respective mentioned combination but also in other combinations or alone without departing from the context of the present invention.

Preferred exemplary embodiments of the invention are illustrated in the drawings and are explained in the following description in more detail, wherein identical reference numbers refer to identical, or similar, or functionally identical components.

BRIEF DESCRIPTION OF THE DRAWINGS

In the figures, schematically

FIG. 2a shows a section along the section line A-A according to FIG. 2.

DETAILED DESCRIPTION

Figure 1:
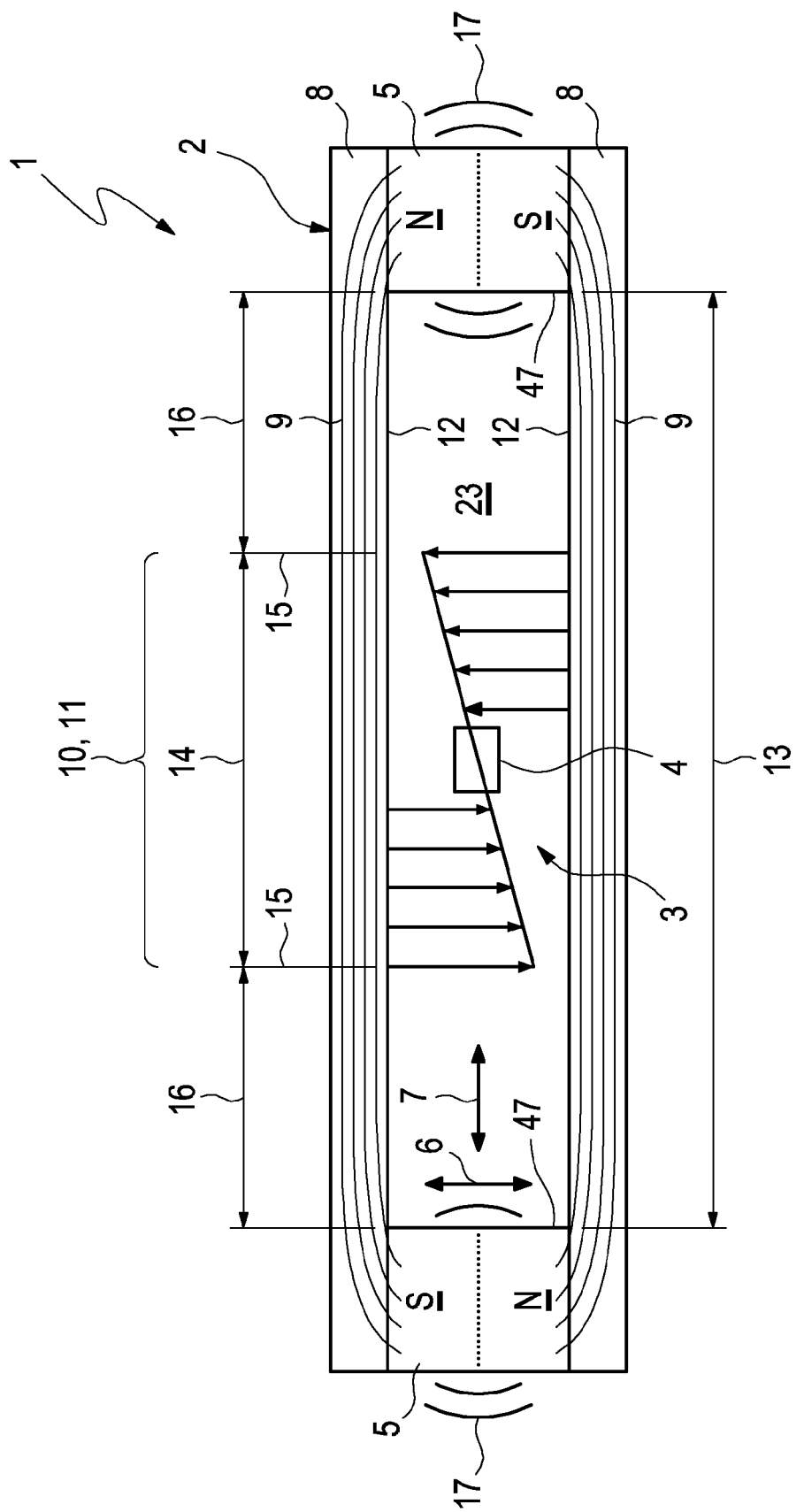
FIG. 1 shows a greatly simplified side view of a position sensor.

According to FIG. 1, a linear magnetic position sensor 1 comprises a magnetic field generating unit 2 for generating a magnetic field 3 indicated by arrows. Furthermore, the position sensor 1 has a Hall sensor 4 which is connected to a suitable evaluating circuit which is not illustrated or described here in more detail. Preferably, the Hall sensor 4 and the evaluating circuit are combined into a common component. This component can be configured, e.g., as Hall sensor IC (Hall sensor with freely programmable integrated electronics). The Hall sensor 4 detects a magnetic field in a known manner and generates therewith correlated electrical measurement signals.

The magnetic field generating unit 2 has two permanent magnets 5 which are polarized with respect to a transverse direction 6 indicated by a double arrow. Accordingly, a south pole S and a north pole N of the respective permanent magnet 5 are located, with respect to the transverse direction 6, at opposite ends of the respective permanent magnet 5. In the case of the position sensor 1 introduced here, the permanent magnets 5 are disposed spaced apart from each other in a longitudinal direction 7 which extends perpendicular to the transverse direction 6 and is indicated by a double arrow.

Moreover, the magnetic field generating unit 2 has two magnetic conductor elements 8 which in each case connect one pole of the one permanent magnet 5 to one pole of the other permanent magnet 5. The magnetic conductor elements 8 are magnetically conductive. Accordingly, this results in a magnetic flux 9 indicated by flux lines through the magnetic conductor elements 8 between the permanent magnets 5.

In the case of advantageously configured permanent magnets 5, the permanent magnets' 5 height extending in the transversal direction 6 is smaller than the length extending in the longitudinal direction 7. Thus, the permanent magnets 5 have a larger contact surface on the magnetic conductor elements 8 and thus have an improved transition of the magnetic field to the magnetic conductor elements 8.

The permanent magnets 5 can preferably be made in each case from a single piece. It is also possible to form the permanent magnets 5 in multiple pieces. In particular, the permanent magnets can be configured, preferably in the longitudinal direction 7, in a multi-layered or stacked manner.

The Hall sensor 4 is now disposed with a region 10 of the magnetic field 3 which forms a linear measuring section 11. The Hall sensor 4 and the magnetic field generating unit 2 are linearly displaceable relative to each other along the longitudinal direction 7. Hereby, the Hall sensor 4 can be positioned within the measuring section 11. Depending on its relative position in the measuring section 11, the Hall sensor 4 generates therewith correlated measuring signals which can be used in the mentioned evaluating circuit for calculating the position of the Hall sensor 4 within the measuring section 11.

The magnetic conductor element 8 consists advantageously of a magnetically conductive material. This involves preferably a magnetically soft material. In particular, this can involve a ferromagnetic material, wherein an iron sheet is preferred.

The magnetic conductor elements 8 can be made in each case from a single piece. It is also possible to form the magnetic conductor elements 8 in multiple pieces. In particular, they can be configured, preferably in the transversal direction 6, in a multi-layered or stacked manner.

In the example shown, the magnetic field generating unit 2 has a geometrically simple shape. For example, on an inner side 12 facing toward the measuring section 11, the magnetic conductor elements 8 have a planar shape. Moreover, in the example, the magnetic conductor elements' 8 inner sides 12 facing each other are disposed in the longitudinal direction such that they are equidistant with respect to each other. Furthermore, the magnetic conductor elements 8 extend here in the longitudinal direction 7 and also parallel to each other. Moreover, in the preferred example, they extend linearly and with a constant cross-sectional profile in the longitudinal direction 7. For example, the magnetic conductor elements 8 have a rectangular cross-sectional profile. For other embodiments, other geometries for the magnetic conductor elements 8 are principally also conceivable. For example, they can be trapezoidal, or bent, or curved, or can be shaped in a different manner. Here, the respective shaping is in each case specifically selected in such a manner that the linearity of the course of the magnetic field within the linear measuring section 11, indicated by a straight line drawn in the magnetic field 3, is supported or facilitated.

Figure 5:
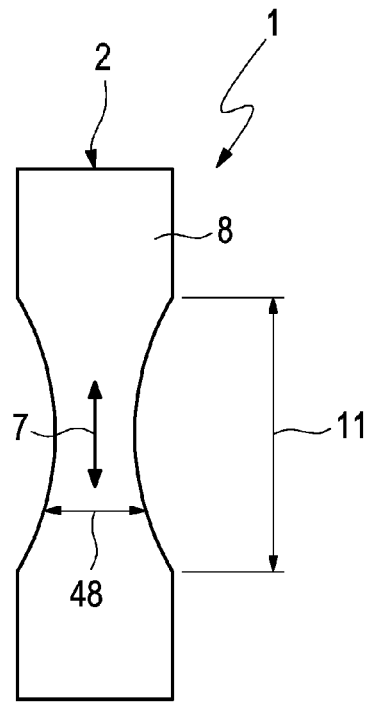
Figure 5:
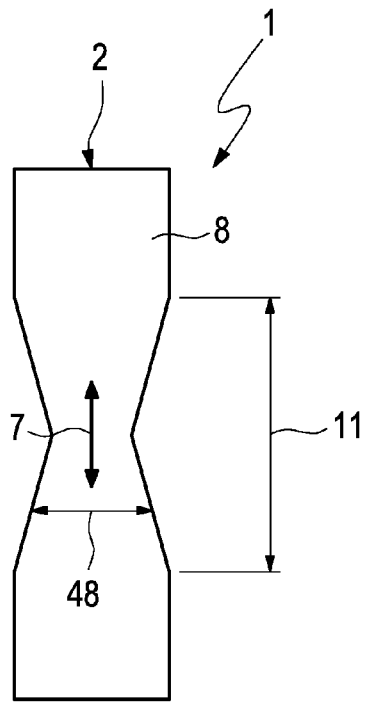
Figure 6:
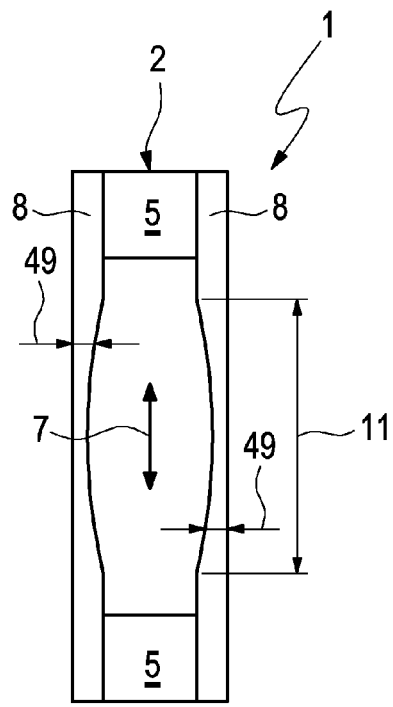
Figure 6:
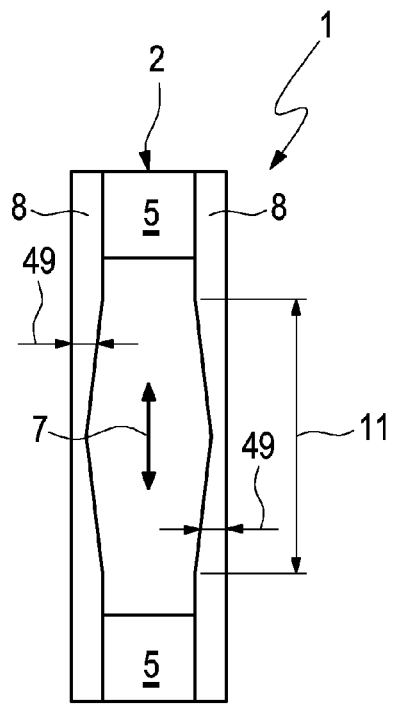

For example, the FIGS. 5 and 6 show embodiments in which the magnetic conductor elements 8 have a varying geometry with respect to the longitudinal direction 7. For example, the FIGS. 5a and 5b show different embodiments in which a width 48 of the magnetic conductor elements 8 varies along the longitudinal direction 7. The varying width 48 occurs at least within the measuring section 11 and can be utilized for linearization of the magnetic field within the measuring section 11. FIG. 5a shows an embodiment in which the varying width 48 is implemented by means of a round, in particular arc-shaped contour. In contrast to this, FIG. 5b shows an embodiment in which the varying width 48 is implemented by a wedge shape.

In contrast, in the case of the embodiments in the FIGS. 6a and 6b it is provided to vary a thickness 49 of the respective magnetic conductor element 8 in the longitudinal direction 7. Here too, the variation of the thickness 49 is provided at least within the measuring section 11. FIG. 6a shows again an embodiment in which the variation of the thickness 49 is implemented by a curved, in particular arc-shaped inner contour. In contrast to this, FIG. 6b shows an embodiment in which the varying thickness 49 is implemented through a wedge-shaped contour on the inner side of the respective magnetic conductor element 8. Basically, the respective course of the thickness 49 along the longitudinal direction 7 can also be implemented by contouring the respective outer side of the respective magnetic conductor element 8 so that then the inner sides 12 facing each other as in the embodiment shown in FIG. 1 are equidistant relative to each other and/or are planar.

The variation of the width 48 in the longitudinal direction 7 as illustrated, e.g., in the FIGS. 5a and 5b, and the variation of the thickness 49 along the longitudinal direction 7 as illustrated exemplary in the FIGS. 6a and 6b can be implemented alternatively or cumulatively and preferably takes place mirror-symmetrically with respect to a mirror plane which extends transverse to the longitudinal direction 7 through the middle of the measuring section 11.

Although in the embodiments of FIGS. 5 and 6 shown here, both magnetic conductor elements 8 have varying widths 48 and varying thicknesses 49, respectively, an embodiment is principally also conceivable in which only one of the magnetic conductor elements 8 has a varying width 49 and a varying thickness 49, respectively, while the other magnetic conductor element 8 can have a constant width 48 and a constant thickness 49, respectively. Likewise, mixed constructions are conceivable in which, for example, the one magnetic conductor element 8 has a varying width 48 while the other magnetic conductor element 8 has a varying thickness 49.

Changing the magnetic conductor elements 8 in the longitudinal direction 7 with respect to their width 48 and/or with respect to their thickness 49 can be implemented, for example, by means of a forming technology or by means of machining Likewise, it is principally possible to specifically produce the magnetic conductor elements 8 by stamping processes in such a manner that said conductor elements have the desired geometry.

Preferably, each magnetic conductor element 8 connects the south pole S of the one permanent magnet 5 to the north pole N of the other permanent magnet 5. This results in the annularly closed magnetic flux circuit which facilitates the formation of a linear magnetic field within the measuring section 11.

The two permanent magnets 5 are spaced apart from each other in the longitudinal direction 7. A corresponding distance or magnet distance is designated in FIG. 1 with 13. In the longitudinal direction 7, the measuring section 11 is shorter than the magnet distance 13. A length of the measuring section 11 is designated in FIG. 1 with 14. In the preferred example shown here, the measuring section 11 is disposed centrally between the two permanent magnets 5 with respect to the longitudinal direction 7. Accordingly, the longitudinal ends 15 of the measuring section 11 each have a distance 16 from the respective adjacent permanent magnet 5, wherein in the case of a central arrangement of the measuring section 11, the two distances 16 are identical. In the example of the FIG. 1, the length 14 of the measuring section 11 is approximately 40% of the magnet distance 13 between the permanent magnets 5. In general, the measuring section 11 extends over a maximum of 70% or a maximum of 50% of the magnet distance 13.

Thus, it is clearly shown in FIG. 1 that the permanent magnets' 5 inner ends 47, which face each other and the measuring section 11, have the magnet distance 13 from each other, wherein in the example shown, the magnet distance 13 is larger than the measuring section 11. In each case, due to the selected construction, the permanent magnets 5 are disposed with respect to the longitudinal direction 7 completely outside of the measuring section 11.

For implementing a magnetic field 3 that is linear up to the longitudinal ends 15 within the measuring section 11, the distances 16 can be dimensioned such that at the longitudinal ends 15, the influence of a magnetic field 17 of the respective adjacent permanent magnet 5 on the prevailing magnetic field 3 between the magnetic conductor elements 8 in the measuring section 11 can be disregarded for the magnetic field measurement of the Hall sensor 4 even if said Hall sensor is located at the respective longitudinal end 15 of the measuring section 11. By maintaining such a minimum distance 16 between the permanent magnets 5 and the longitudinal ends 15 of the displacement region of the Hall sensor 4, an excellent linearity of the magnetic field 3 can be achieved within the measuring section 11.

Furthermore, the magnetic conductor elements 8 are dimensioned or have such a thickness in the transverse direction 6 that within the magnetic conductor elements 8, no magnetic saturation or only a low saturation occurs which can be disregarded for the magnetic field measurement of the Hall sensor 4. The consequence is that the flux lines transferred through the magnetic conductor elements 8 between the permanent magnets 5 extend almost exclusively within the magnetic conductor elements 8. Hereby, it is in particular possible to avoid stray fields which extend outside of the magnetic conductor elements 8 and could have a negative effect on the linearity of the magnetic field 3 within the measuring section 11. The magnetic flux lines 9 extending within the magnetic conductor elements 8 extend in a wide region disposed centrally between the two permanent magnets 5 and extend parallel to each other, which facilitates the formation of the linear magnetic field 3 within the measurement section 11. The flux lines 9 only curve in an end region adjacent to the permanent magnets 5 in order to be able to enter the respective poles of the permanent magnets 5 or to exit therefrom.

In the example shown, the magnetic field generating unit 2 is configured mirror-symmetrically with respect to a plane which extends perpendicular to the longitudinal direction 7. In the example, the magnetic field generating unit 2 is also configured mirror-symmetrically with respect to a plane which extends perpendicular to the transverse direction 6. This results overall in a geometrically simple and therefore inexpensively implementable structure. In particular, the permanent magnets 5 and the magnetic conductor elements 8 are in each case identical parts.

Figure 2:
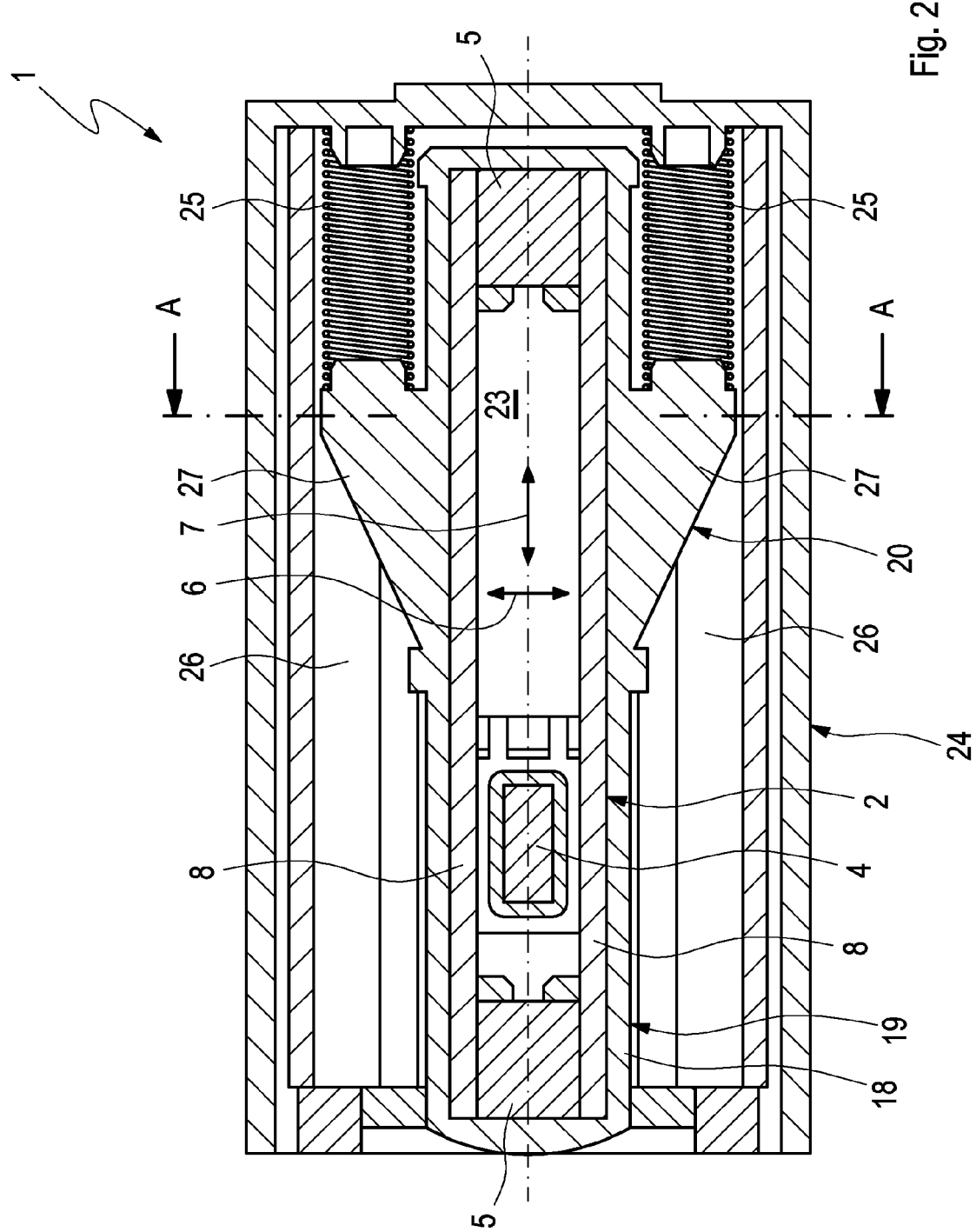
FIG. 2 shows a longitudinal section of the position sensor, but for a different embodiment.
Figure 2:
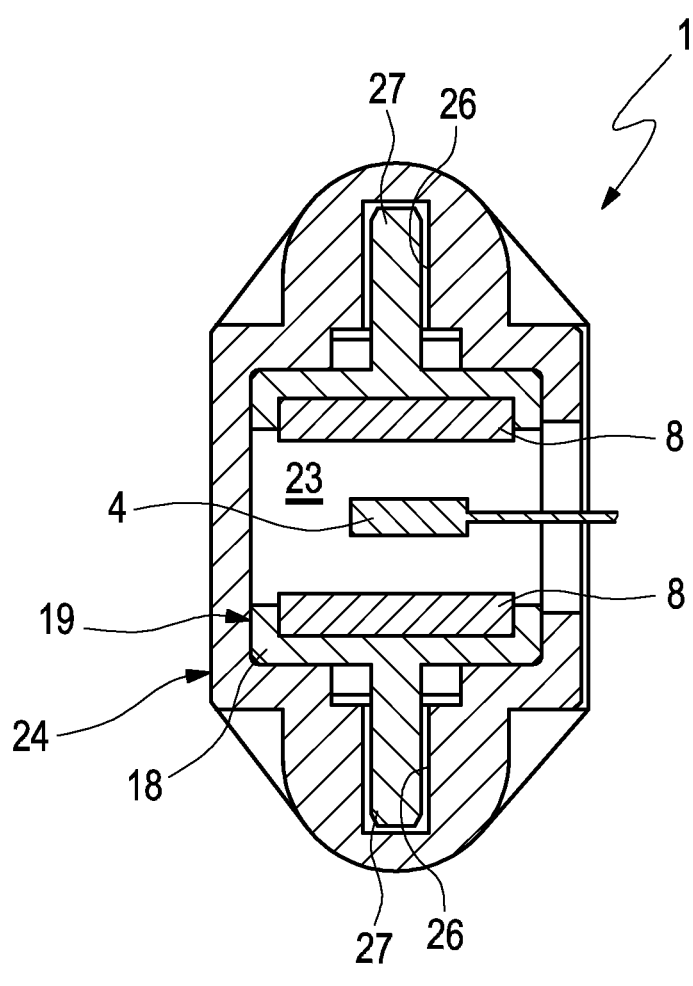
Figure 3:
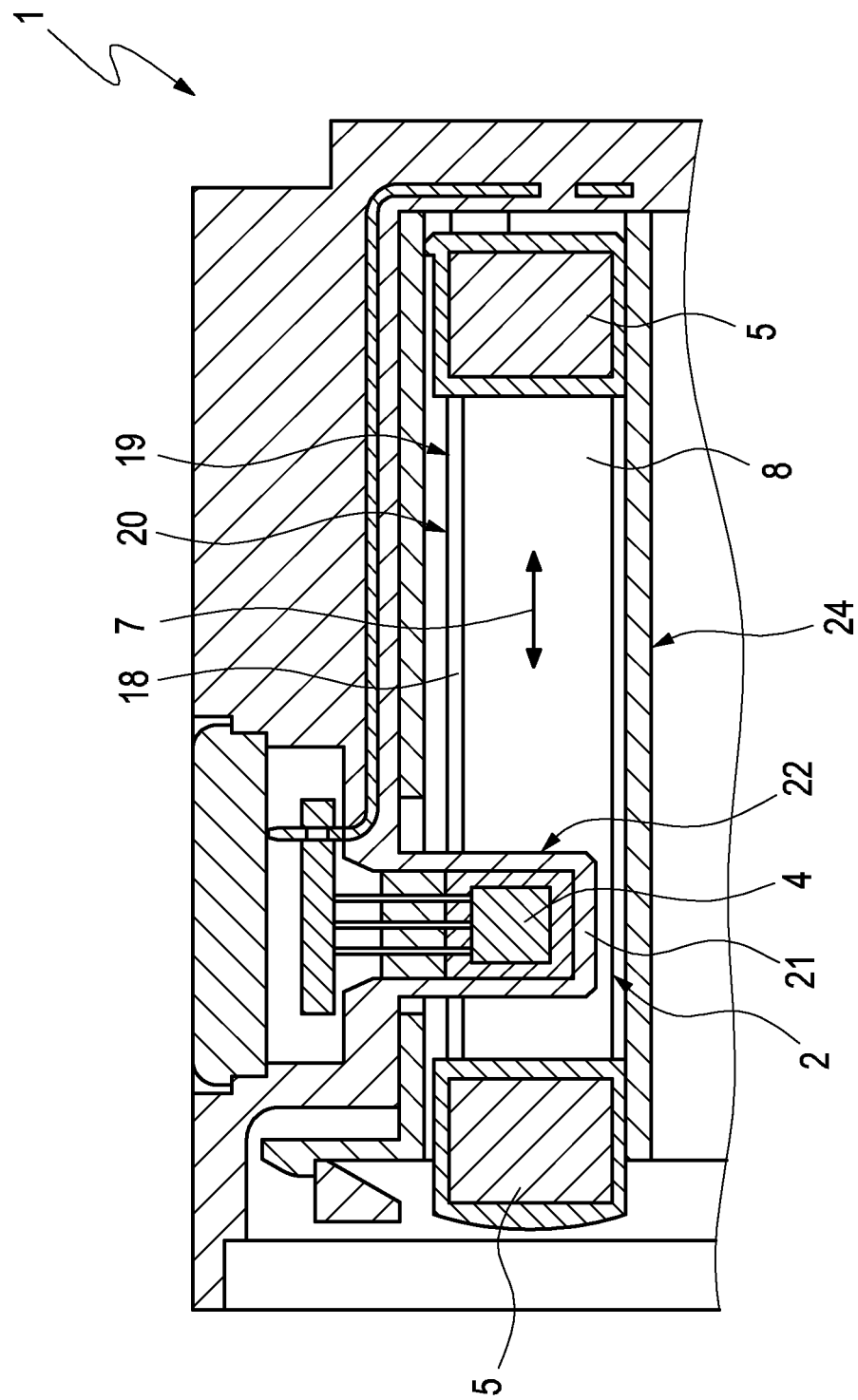
FIG. 3 shows a further longitudinal section of the position sensor which is rotated by 90° with respect to the illustration of FIG. 2.

According to the FIGS. 2, 2a and 3, the magnetic field generating unit 2 can be coated with a plastic 18 in order to position the individual components, thus the permanent magnets 5 and the magnetic conductor elements 8, relative to each other. Hereby, on the one hand, a plastic coating 19 is formed. At the same time, a magnet unit 20 is created which surrounds the magnetic field generating unit 2. The plastic 18 can be injection molded or molded onto the components of the magnetic field generating unit 2.

The Hall sensor 4 too can be coated with a plastic 21. Expediently, the plastic 21 is injection molded or molded thereon. Here, the plastic 21 forms a sensor carrier 22 which laterally immerses into the gap which is designated in FIG. 1 with 23 and is located in the transverse direction 6 between the magnetic conductor elements 8.

Further, the position sensor 1 can be equipped with a sensor housing 24 which encloses or encapsulates the position sensor 1, namely in such a manner that it is sealed from the outside. The sealing can realize a dirt sealing and/or a moisture sealing and/or a gas sealing.

In the embodiment shown in the FIGS. 2, 2a and 3, the Hall sensor 4 is disposed stationarily in the sensor housing 24. In contrast to this, the magnetic field generating unit 2 or, respectively, the magnet unit 20 is disposed to be linearly displaceable in the sensor housing 24. Moreover, at least one pre-tension spring 25 is provided here in the sensor housing 24, which is shown in FIG. 2. In the example, two such pre-tension springs 25 are provided. The respective pre-tension spring 25 is supported on the one side on the sensor housing 24 and on the other side on the magnetic field generating unit 2 or, respectively, the magnet unit 20. Hereby, the magnetic field generating unit 2 or, respectively, the magnet unit 20 is pretensioned in one of its end positions. In the example, the pre-tension springs 25 are helical compression springs. Here, the respective pre-tension spring 25 can be disposed in a guide groove 26 in which a guide element 27 of the magnetic field generating unit 2 or, respectively, the magnet unit 20 in the sensor housing 24 is disposed so as to be guided in a linearly displaceable manner. Expediently, the pre-tension spring 25 interacts with the respective guide element 27. In the example, the guide elements 27 are injection molded on the magnetic field generating unit 2; thus, they form in particular an integral part of the coating 19.

Figure 4:
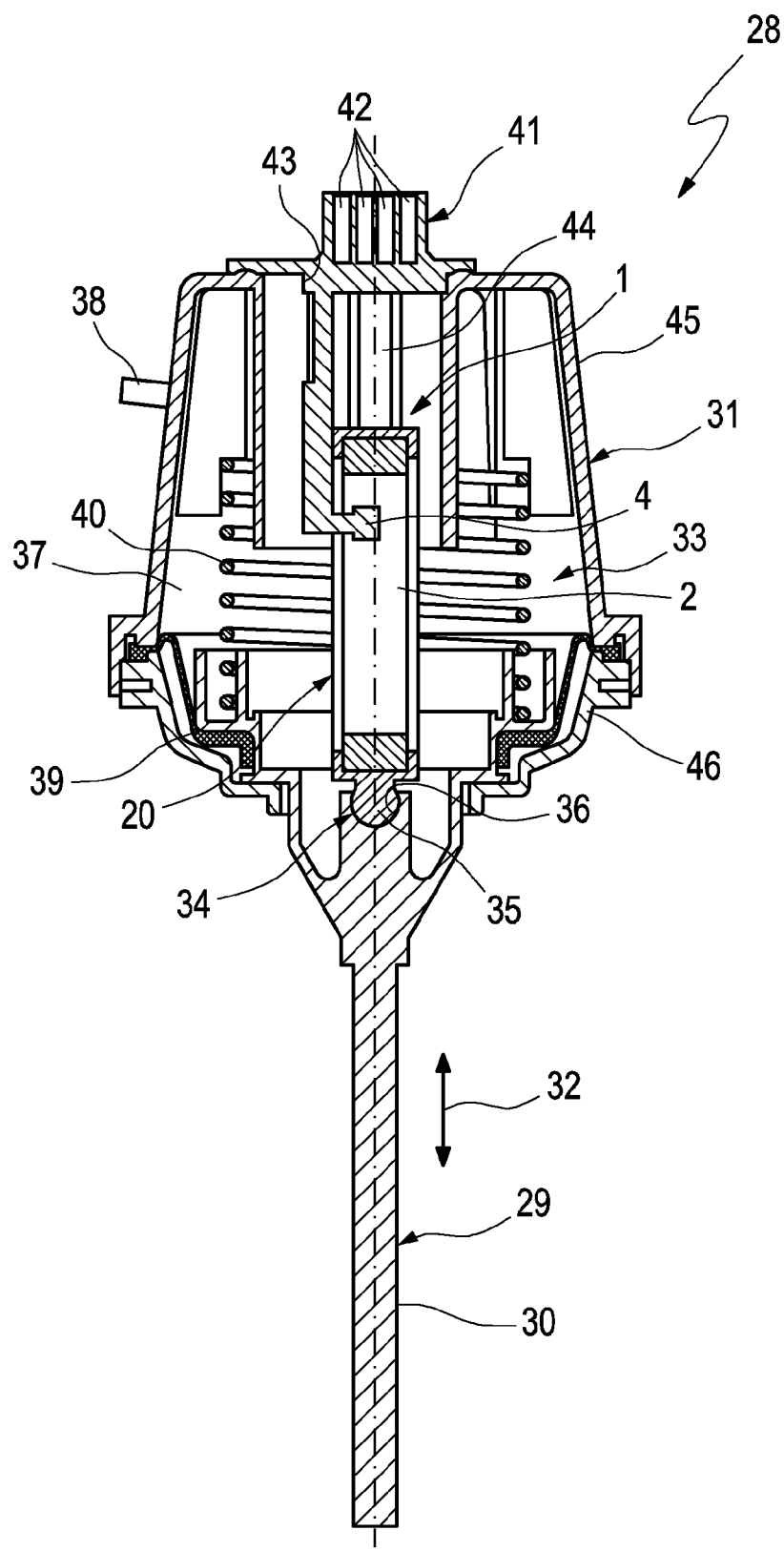
FIG. 4 shows a greatly simplified longitudinal section of a linear actuator, FIGS. 5a and 5b each show a greatly simplified top view of a position sensor for different embodiments, FIGS. 6a and 6b each show a greatly simplified side view of the position sensor for different embodiments.

According to FIG. 4, the above-described position sensor 1 can be used in a linear actuator 28. The linear actuator 28, in turn, can be used in a motor vehicle. The linear actuator serves for linear actuation, thus for linearly displacing a component, e.g., a butterfly valve or a slide valve or the like. For this, the linear actuator 28 has a coupling rod 29 which can be coupled to the respective component to be linearly displaced, which is not illustrated here. For example, the coupling rod 29 can have an external thread 30 for this purpose. Furthermore, the coupling rod 29 is linearly displaceable relative to an actuator housing 31, according to a double arrow 32. In addition, the linear actuator 28 has an actuator unit 33 by means of which the coupling rod 29 can be linearly displaced relative to the actuator housing 31. The position sensor 1 is structurally integrated in the linear actuator 28 in such a manner that by means of the position sensor 1, the relative position between coupling rod 29 and actuator housing 31 can be detected. Preferred here is the embodiment shown in FIG. 4 in which the coupling rod 29 is drivingly connected to the magnetic field generating unit 2, whereas the Hall sensor 4 is disposed stationarily on the actuator housing 31. The linear displacement of the coupling rod 29 relative to the actuator housing 31 results in a corresponding linear displacement between the magnetic field generating unit 2 and the Hall sensor 4.

In the example shown, the coupling rod 29 is drivingly coupled to the magnetic field generating unit 2 via a ball joint 34. The ball joint 34 comprises a ball head 35 and a ball socket 36. In the example, the ball head 35 is integrally formed on the magnetic field generating unit 2 or, respectively, integrally formed on the magnet unit 20. For example, the ball head 35 forms an integral part of the coating 19 which is injection-molded on the remaining components of the magnetic field generating unit 2. In the example, the ball socket 36 is formed by an integrally formed part of the coupling rod 29. The ball joint 34 eliminates manufacturing tolerances and allows in addition a play-free coupling between the coupling rod 29 and the position sensor 1. It is clear that other suitable couplings can principally also be implemented.

Expediently, the actuator unit 33 operates pneumatically. In this case, the actuator housing 31 has a control chamber 37 which, e.g. via an adequate control pressure connection 38, can be pressurized with a pneumatic control pressure. The control chamber 37 is closed with an elastic diaphragm 39. The diaphragm is elastically deformable. The coupling rod 29 is drivingly connected to the diaphragm 39. In the example, the coupling rod 29 penetrates the diaphragm 30, wherein a tight connection between the diaphragm 39 and the coupling rod 29 is created. Depending on the control pressure in the control chamber 37, the diaphragm 39 deforms resulting in the desired linear displacement 32 of the coupling rod 29. In the example of FIG. 4, the coupling rod 29 is pretensioned in an end position by means of a return spring 40 which is disposed in the control chamber 37 or, respectively, in the actuator housing 31.

For the usage of the position sensor 1 in the linear actuator 28, as proposed here, the position sensor 1 can have a Hall sensor unit 41. Said Hall sensor unit 41 comprises the Hall sensor 4 and electrical connections 42 of the position sensor 1. The signals generated by the Hall sensor 4 can be tapped via the connections 42. The Hall sensor unit 41, e.g., is manufactured integrally using an injection molding process. The Hall sensor 4 and also the lines running to the connections 42 are then enclosed by the injection-molded Hall sensor unit 41. The Hall sensor unit 41 is mounted on the actuator housing 31. For this, the actuator housing 31 can have a suitable mounting opening 43.

In the actuator housing 31, a linear guide 44 is formed, in particular formed integrally. The magnet unit 20 interacts with said linear guide 44 in such a manner that the magnet unit 20 can be displaced linearly guided in the linear guide 44 on the actuator housing 31 and parallel to the linear displacement 32 of the coupling rod 29.

In the embodiment shown in FIG. 4, the actuator housing 31 has a pot-shaped body 45 which is closed with a cover 46. The diaphragm 39 is clamped between said pot body 45 and the cover 46. The cover 46 forms at the same time an end stop for the coupling rod 29 when the latter, e.g. driven by the return spring 40, is moved out of the actuator housing 31 to the maximum extent.

The invention claimed is:

1. A linear magnetic position sensor, comprising:
   a magnetic field generating unit having two permanent magnets for generating a magnetic field,
   a Hall sensor disposed in a region of the magnetic field forming a linear measuring section, wherein the Hall sensor and the magnetic field generating unit are linearly displaceable relative to one another along a longitudinal direction in order to position the Hall sensor within the measuring section,
   wherein the permanent magnets are polarized in a transverse direction running perpendicular to the longitudinal direction,
   wherein the permanent magnets are spaced apart from one another in the longitudinal direction, and wherein each pole of one of the permanent magnets is connected to a pole of the other permanent magnet via a magnetic conductor element;
   wherein the measuring section is shorter in the longitudinal direction than a magnet distance defined between the permanent magnets, and is spaced apart at its longitudinal ends from the permanent magnets such that the influence of another magnetic field of the adjacent permanent magnet on the prevailing magnetic field between the magnetic conductor elements in the measuring section is disregarded for purpose of a magnetic field measurement of the Hall sensor at the longitudinal ends of the measuring section.

2. The position sensor according to claim 1, wherein the Hall sensor is linearly positioned in the measuring section, wherein the measuring section is disposed centrically between the permanent magnets.

3. The position sensor according to claim 2, wherein the measuring section extends in the longitudinal direction over a maximum of 70% of the magnet distance.

4. The position sensor according to claim 1, wherein inner ends of the permanent magnets face toward the measuring section and have a magnet distance from each other in the longitudinal direction, the magnet distance being at least as large as the measuring section, and wherein the permanent magnets are disposed in the longitudinal direction completely outside of the measuring section.

5. The position sensor according to claim 1, wherein the magnetic conductor elements are geometrically configured such that a substantially linear magnetic field is present in the measuring section.

6. The position sensor according to claim 1, wherein the magnetic conductor elements have a varying width and thickness along the longitudinal direction, and wherein the magnetic conductor elements have inner sides facing one another and the measuring section, the magnetic conductor elements being at least one of equidistant and planar in the longitudinal direction.

7. The position sensor according to claim 1, wherein the magnetic conductor elements consist of a magnetically soft material, the magnetic conductor elements extend in the longitudinal direction, the magnetic conductor elements extend parallel to one another, the magnetic conductor elements extend linearly, the magnetic conductor elements each have a constant cross-sectional profile in the longitudinal direction, and each magnetic conductor element connects the south pole of the one permanent magnet to the north pole of the other permanent magnet.

8. The position sensor according to claim 1, wherein the magnetic conductor elements have a thickness in the transverse direction so that at most a negligible magnetic saturation occurs in the magnetic conductor elements.

9. The position sensor according to claim 1, wherein the magnetic field generating unit is coated with plastic, wherein the Hall sensor is coated with plastic, and further comprising a position sensor encapsulated in a sensor housing such that the position sensor is sealed from the outside in at least one of a dirt-tight, moisture-tight, and gas-tight manner.

10. The position sensor according to claim 1, wherein the magnetic field generating device is configured to mirror-symmetrically with respect to at least one of a plane extending at least generally perpendicular to the longitudinal direction and a plane extending at least generally perpendicular to a transverse direction.

11. The position sensor according to claim 1, wherein the Hall sensor is disposed stationarily in a sensor housing and the magnetic field generating unit as a magnet unit is disposed linearly displaceable in the sensor housing.

12. The position sensor according to claim 11, further comprising at least one pre-tension spring disposed in the sensor housing, the pre-tension spring being supported, on the one side, on the sensor housing and, on the other side, on the magnet field generating unit, the spring pretensing the latter into an end position, wherein the respective pre-tension spring is disposed in a guide groove and wherein a guide element of the magnetic field generating unit is disposed in the guide groove so as to be guided in a generally linearly displaceable manner and interact with the pre-tension spring.

13. The position sensor according to claim 2, wherein inner ends of the permanent magnets face toward the measuring section and have a magnet distance from each other in the longitudinal direction, the magnet distance being at least as large as the measuring section, and wherein the permanent magnets are disposed in the longitudinal direction completely outside of the measuring section.

14. The position sensor according to claim 2, wherein the magnetic conductor elements are geometrically configured such that a substantially linear magnetic field is present in the measuring section.

15. The position sensor according to claim 2, wherein the magnetic conductor elements have a varying width and thickness along the longitudinal direction, and wherein the magnetic conductor elements have inner sides facing one another and the measuring section, the magnetic conductor elements being at least one of equidistant and planar in the longitudinal direction.

16. The position sensor according to claim 2, wherein the magnetic conductor elements consist of a magnetically soft material, the magnetic conductor elements extend in the longitudinal direction, the magnetic conductor elements extend parallel to one another, the magnetic conductor elements extend linearly, the magnetic conductor elements each have a constant cross-sectional profile in the longitudinal direction, and each magnetic conductor element connects the south pole of the one permanent magnet to the north pole of the other permanent magnet.

17. The position sensor according to claim 2, wherein the magnetic conductor elements have a thickness in the transverse direction so that at most a negligible magnetic saturation occurs in the magnetic conductor elements.

18. The linear magnetic position sensor according to claim 1,
wherein at least one of the magnetic field generating unit and the Hall sensor is coated with plastic.

19. The linear magnetic position sensor according to claim 1, further comprising:
at least one pre-tension spring with one end that is fixed and another end that is operatively attached to the magnetic field generating unit, the at least one pre-tension spring being configured to pretense the latter into an end position.

* * * * *